United States Patent [19]
Pollitt

[11] 3,757,302
[45] Sept. 4, 1973

[54] RESPONSIVE POWER-FAIL DETECTION SYSTEM

[75] Inventor: Gary L. Pollitt, Fountain Valley, Calif.

[73] Assignee: Addressograph Multigraph Corporation, Cleveland, Ohio

[22] Filed: Nov. 16, 1971

[21] Appl. No.: 199,188

[52] U.S. Cl. .............................. 340/147 R, 317/22
[51] Int. Cl. .............................. H02h 7/20, H03k 17/00
[58] Field of Search .............................. 340/147 R, 147 P, 340/248 B, 419; 317/22; 322/11; 307/87

[56] References Cited

UNITED STATES PATENTS

| | | | |
|---|---|---|---|
| 3,407,338 | 10/1968 | Secunde | 317/22 |
| 3,471,749 | 10/1969 | Harris | 307/87 X |
| 3,560,861 | 2/1971 | Milleker et al. | 317/22 X |
| 3,665,253 | 5/1972 | Stefani | 317/22 |

*Primary Examiner*—Donald J. Yusko
*Attorney*—Michael G. Painter

[57] ABSTRACT

An electronic system which automatically monitors the amplitude of a single phase AC or DC power source and provides electrical signals whenever a power-fail condition is detected and, afterwards, whenever a power-recovery condition is detected. The electrical signals provided by the present invention are typically routed to an operating system which derives its primary power from the monitored power source, such as, for example, a digital computer. The signals enable the operating system to go through an orderly termination of its operation under a power-fail condition. In the case of a computer, a termination sequence may be initiated and data properly stored before power is shut-down and all operations cease. When a power-recovery condition is detected, the present invention provides electrical signals which enable the operating system to restart in a programmed manner. The present invention is comprised of a novel combination of electronic switches, logic circuits, latches, timing and delay circuits and a voltage comparator circuit.

10 Claims, 9 Drawing Figures

RESPONSIVE POWER-FAIL DETECTION SYSTEM

BACKGROUND OF THE INVENTION

1. Field of the Invention

This invention relates to electronic power monitoring apparatuses and more particularly to an electronic system which automatically detects power-fail and power-recovery conditions in a primary power source and issues signals which enable any system deriving its power from the monitored source to shut-down and restart its operations in a programmed manner.

2. Prior Art

A number of different electronic power monitoring systems are disclosed by the prior art. These known systems, however, have serious limitations and shortcomings. In some cases, only a single output signal is provided when a power-fail condition is detected, such as the change of state of a two-state device. While a single signal can automatically initiate a shut-down sequence in an operating system utilizing the monitored power source, an operator is typically required to initiate whatever restart sequence may be necessary when the power source has recovered to an acceptable level. In other systems of the prior art, an automatic restart capability is provided, but only under a limited set of conditions. The present invention overcomes these limitations of the prior art systems by providing a sequence of signals which enable both the fully automatic shut-down of the operating system and its restart in response to a relatively broad range of power conditions.

Some power monitoring systems of the prior art lack the means for discriminating between the indications of an actual power failure condition and random, very short term fluctuations of the amplitude of the monitored primary power source due to noise or line variations. Consequently, these monitoring systems may unnecessarily initiate a power shut-down, especially in an electrically noisy environment. Such erroneous detections can result in costly down time of the operating system. The present invention overcomes this shortcoming by providing discrimination means which substantially reduce the risk of inadvertent shut-down.

Still other systems known in the prior art utilize relays as the means for generating the power-fail signal. The switching time of a relay is relatively slow, (typically at least 10 milliseconds). The use of relays, therefore, introduces a substantial delay between the occurrenece of a power-fail condition and the issuance of the power-fail signal which initiates the shut-down sequence. As a result, the operating system's power supply is required to contain sufficient energy storing means to enable it (the system) to operate for the relatively long time interval between the occurrence of the failure and the completion of the shut-down sequence. The present invention does not utilize relays in generating the power-fail signal in response to a detected power failure. Instead, it contemplates the use of relatively fast switching logic circuits. Thus, less unwanted delay is introduced before the power-fail signal issues and initiates the shut-down sequence. Consequently, less energy storage capability is required in the operating system's power supply. For a given energy storage capability, the present invention reduces the risk of energy depletion occurring before the programmed shut-down sequence is completed. However, as will become apparent from the description hereinbelow, the present invention does introduce some tolerable delay in the generation of the power-fail signal. This intentional delay is introduced in connection with discriminating between actual power failures and random short-term power fluctuations. Thus, the present invention achieves an optimum tradeoff between the conflicting requirements of rapid response and reliable discrimination.

Some power monitoring systems presently used in the computer field require supporting electronics which can respond to a power-fail signal and sequence the memory for shut-down or start-up in conjunction with the central processing unit. Contrariwise, the present invention provides, in addition to the power-fail signal, other control signals which can be utilized directly by the central processing unit in carrying out the shut-down or start-up sequences. The availability of these control signals substantially eliminates the need for any memory interfacing support electronics in achieving the desired results.

Many automatic, responsive power monitoring systems presently in use in computer systems applications do not protect against memory loss under all line conditions below the acceptable threshhold. Often, data loss occurs due to sustained operation at very close to the threshhold level or as a result of a power source fluctuation at a natural frequency of the system. The present invention substantially overcomes these shortcomings of the prior art by providing the capability to generate a discrete power-fail signal whenever the amplitude of the primary power source drops below the predetermined threshhold for a predetermined time interval.

Thus, while certain responsive power monitoring systems are disclosed by the prior art, there has heretofore been none which combines in one system all of the novel feature advantages and capabilities found in the present invention.

BRIEF SUMMARY OF THE INVENTION

The present invention is a responsive power-fail detection system adapted to protect an indepent operating system such as, for example, a digital computer from the random interruptions, loss of data and other malfunctions which are typically caused by excessive fluctuations and/or failures in a primary power source poviding power to the operating system.

This invention monitors the amplitude of a single phase AC or a DC primary power source and compares it to a predetermined reference voltage level which represents the minimum acceptable level of the power source. When the monitored source voltage falls below the reference level for a predetermined time interval, a Power-Fail signal is generated by this invention. The Power-Fail signal acts as an early warning signal to the operating system in that it appears before the regulated power supplies, which derive their power from the primary source, have been affected by the drop in the amplitude of the primary source. The more energy storage capability in the regulated power supplies, the more time is available for the operating system to take whatever action is appropriate in response to the Power-Fail signal. When the operating system is a digital computer, the Power-Fail signal is routed to the central processing unit (CPU), to which it effectively says, "A power-fail condition has been detected; in X milliseconds regulated power will be shut-down. Do all necessary bookkeeping to protect data and program."

After a predetermined delay following the appearance of the Power-Fail signal, the present invention outputs a B+ Control signal. The B+ Control signal may be utilized by the operating system to cause a rapid shut-down of any one or more of the regulated power supplies deriving power from the primary power source. In the case of a digital computer, shutting down that regulated power supply which provides the read and write currents for the memory protects the memory against the data loss which could otherwise occur if the regulated voltage level were allowed to vary in response to the fluctuations or failure of the primary power source. The delay between the Power-Fail signal and the B+ Control signal is a function of the time required by the particular operating system to complete its shut-down sequence.

In addition to the Power-Fail and B+ Control signals, the present invention also provides a Reset signal and a Restart signal. The Reset signal appears concurrently with the B+ Control signal. Whereas the Power-Fail and B+ Control signals enable the operating system to go through an orderly shut-down sequence, the Reset and Restart signals enable it to go through an orderly start-up sequence when a power-recovery condition is detected. The presence of the Reset signal may be utilized by the operating system to lock itself into a non-operating mode. The present invention responds to a power-recovery condition by removing the Power-Fail and B+ Control signals; this enables the regulated power supplies, previously shut-down by the presence of the B+ Control signal, to recover to full voltage. However, the Reset Signal is not removed until a predetermined time interval has elapsed following the removal of the B+ Control signal. This delay ensures that the operating system remains non-operative until the regulated power supplies have stabilized. After the aforesaid delay, the Reset signal is removed. The removal of the Reset signal provides an indication to the operating system that it may now initiate whatever start-up sequence is required to enable the resumption of normal operations from the point at which such operations had been interrupted. In the case of a digital computer, the start-up sequence involves doing that data and program bookkeeping which enables the program to pick up operations at the point of interruption. The Restart signal is generated following a predetermined delay after the removal of the Reset signal. The delay is a function of the time required for the operating system to respond to the removal of the Reset signal. The presence of the Restart signal is typically used to initiate the operation of the operating systems; i.e., it serves as the automatic equivalent of a "run" button.

The invented responsive power-fail detection system is comprised of a novel combination of electronic switches, logic circuits, latches, timing and delay circuits and a voltage comparator circuit. In some applications relay latches may be suitable.

When the primary power source is single phase AC power, the present invention provides means for rectifying, clipping and filtering the AC power so as to obtain a DC voltage (with some "ripple") which is a function of the amplitude of the AC power signal. The derived DC voltage is compared to the reference voltage in the voltage comparator circuit. The comparator output is either one of two binary states depending upon whether the derived DC level is equal to or greater than the reference voltage or less than it, the later circumstance representing a possible power-fail condition. If the primary power source is a DC voltage, the rectifying, clipping and filtering capability of the present invention is not required.

If the output state of the comparator indicates that the DC voltage (derived or primary) is less than the reference voltage, and this state persists for a predetermined period, a latch circuit is triggered into a change of state and the Power-Fail signal appears. The predetermined time period is established by a delay circuit; it enables the present invention to discriminate between random, short-term voltage fluctuations in the primary power source and the fluctuations and failures which are potentially detrimental to the proper functioning of the operating system. After another suitable, predetermined time delay, a second latch is triggered and the B+ Control and Reset signals appear.

As indicated above, the B+ Control signal typically causes the shut-down of the regulated power supplies which derive power from the primary power source and, in turn, provides DC voltage to the operating system. The drop-out of the regulated voltage is detected by the present invention which, in response, initiates the operation of a free running start-up oscillator. The start-up oscillator provides a periodic pulse train which, when a power-recovery condition is detected by the voltage comparator, causes the resetting of the two latches, thereby causing the removal of the Power-Fail and B+ Control signals. After a sufficient delay to allow the regulated power supply output to stabilize at its normal output voltage, the Reset signal is removed. After another delay, the Restart signal is generated, the latter causing the operating system to commence normal operations. In some applications, the automatic restart capability of the present invention may not be required, and in these it may be replaced by an external, manually operated start-up switch.

Thus, it is a principal object of the present invention to provide a power monitoring system which automatically (i) detects a predetermined power-fail condition in a primary power source, and (ii) provides signals which enable an operating system deriving power from such a source to shut-down its operations in a preprogrammed manner.

It is another principal object of this invention to provide a power monitoring system which can discriminate between random, short-term power line variations which are not detrimental to the operating system and power-fail conditions which require a programmed shut-down.

A further object of the present invention is to provide a power monitoring system which automatically (i) detects a power-recovery condition in a primary power source after a programmed shut-down, and (ii) provides signals which enable the restart of operations.

The novel features which are characteristic of the present invention, as well as other objects and advantages thereof, will be better understood from the following description, reference being had to the accompanying drawings in which a presently preferred embodiment of the invention is illustrated by example.

DETAILED DESCRIPTION OF THE INVENTION

Figure 1:
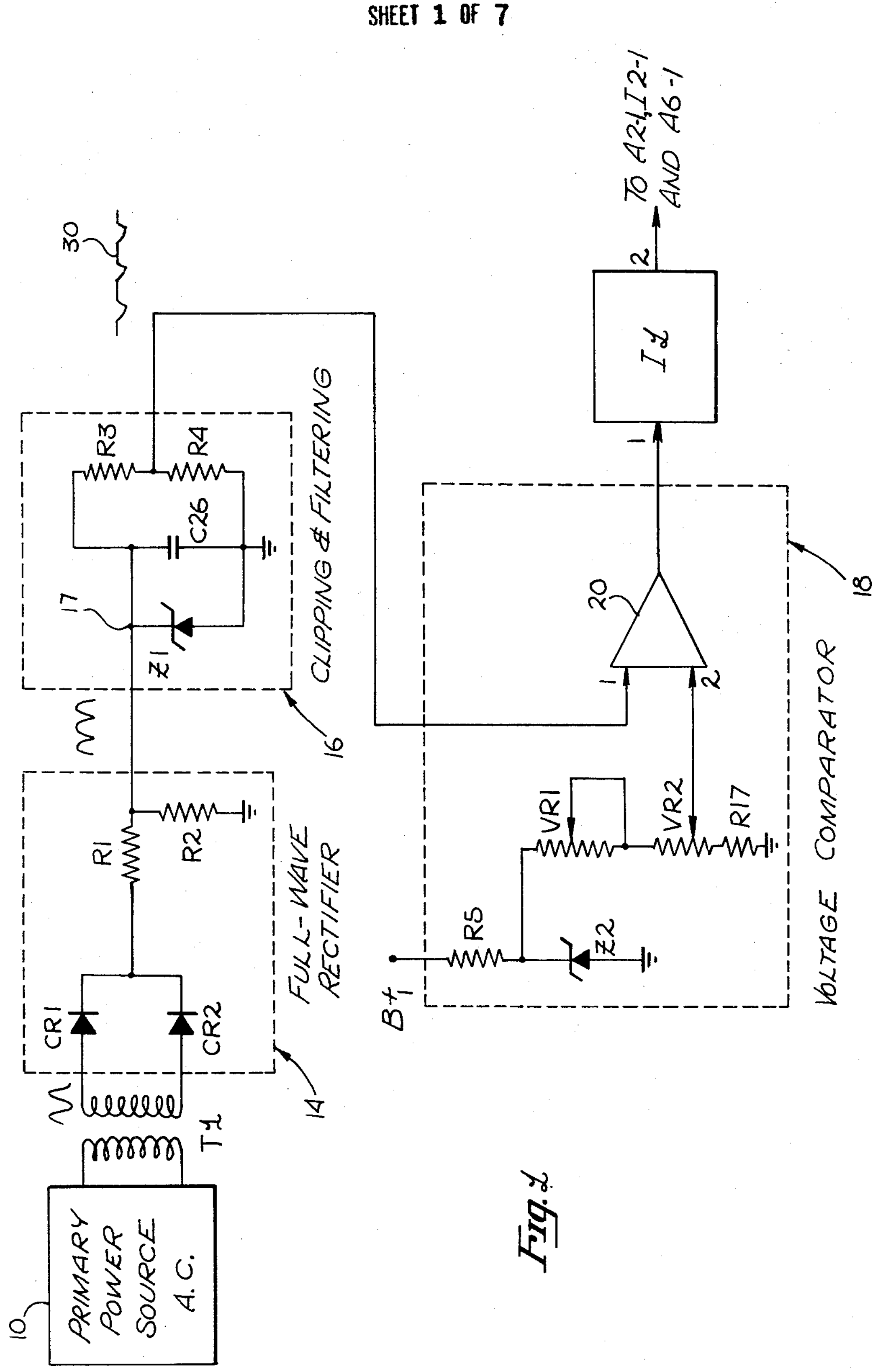
FIGS. 1–6 inclusive present a schematic representation of a preferred embodiment of the present invention.

With reference to FIGS. 1–9, a preferred embodiment of the present invention, particularly adapted to operate with a digital computer, is described in detail. Transistors, variable resistors, capacitors, resistors, diodes, zener diodes and a transformer are designated by the letters Q, VR, C, R, CR, Z and T respectively, followed by a numeral which uniquely identifies each. The elements designated by the letter A represent logic gates which provide a "negative and" (NAND) function. Each NAND gate has two input legs designated by the numerals 1 and 2, and a single output leg designated by the numeral 3. The numeral immediately following the A designation uniquely identifies each such gate; e.g., A9. The numeral following a gate designation identifies the leg of the gate; e.g., A9–2 identifies leg 2 of NAND gate A9. The logic function of the NAND gates is illustrated by the following truth table.

| Binary Input: Leg 1 | Binary Input: Leg 2 | Binary Output: Leg 3 |
|---|---|---|
| 0 | 0 | 1 |
| 1 | 0 | 1 |
| 0 | 1 | 1 |
| 1 | 1 | 0 |

The elements designated by the letter I represent binary inverters, each having single input and output legs designated by the numerals 1 and 2, respectively. The numeral immediately following the I designation uniquely identifies each such inverter, while, for example, the designation I4–1 uniquely identifies the input leg of inverter I4. The NAND gates and inverters may be any of the commercially available DTL (diode-transistor logic) integrated circuits such as, for example, those in the "930 series" produced by Fairchild Camera and Instrument Corporation or Stewart-Warner Corporation.

The preferred embodiment described herein is shown schematically by the combination of FIGS. 1–6 inclusive. The digital computer which is being protected by this embodiment receives its primary power from a single phase AC power source 10 shown in FIG. 1. A central processing unit (CPU) regulated power supply 12 shown in FIG. 6 receives its input power from the primary AC power source 10 and, in turn, provides a regulated DC voltage to the CPU and its memory (not shown). This embodiment of the present invention requires DC voltages $B+_1$, $B+_2$ and B− provided by independent power supplies (not shown), which also receive their input power from primary AC power source 10. The power supplies providing voltages $B+_1$, $B+_2$ and B− typically have sufficient energy storing capacity to enable the present invention to operate reliably for approximately 15 milliseconds after a loss of primary power. Since the shut-down sequence of the CPU can normally be completed in much less time than this, the present invention receives sufficient supply voltages during the critical shut-down phase to ensure that it performs reliably.

This invention automatically monitors the amplitude of the AC power provided by the primary AC power source 10. Whenever a power-fail condition is detected, a Power-Fail signal is issued, followed, after a predetermined delay of $\tau_3$ milliseconds, by a CPU B+ Control signal. The Power-Fail signal is routed to the CPU and provides an indication that a power-fail condition has been detected and that the CPU regulated power supply will be shut-down in $\tau_3$ milliseconds. The CPU typically responds by doing the necessary (preprogrammed) bookkeeping to store and protect data and the program. The subsequent issuance of the CPU B+ Control signal causes the shut-down of the CPU regulated power supply 12. This is typically achieved by causing a high power transistor in a "dump" circuit (not shown), connected to the output of the supply 12, to go into conduction. Sufficient energy storing capacity in the CPU regulated power supply 12 enables it to provide adequate power to the CPU during the interval between the priary power failure and the issuance of the CPU B+ Control signal. Thus, there is adequate DC power available to the CPU to enable it to complete the preprogrammed shut-down sequence reliably. Since the CPU regulated power supply 12 provides the read and write currents to the computer memory, its shut-down after completion of the CPU shut-down sequence ensures the protection of all data stored in the memory during the power-fail condition.

Concurrent with the issuance of the CPU B+ Control signal, the present invention (i) issues a Reset signal to the CPU, and (ii) removes a Restart signal normally presented to the CPU. The Reset signal is typically utilized by the CPU to inhibit any computational or other operations. The Reset signal is not removed until a predetermined time interval of $\tau_5$ milliseconds has elapsed following the removal of the CPU B+ Control signal, the latter occurring after the detection of a power-recovery condition. The power-recovery condition is detected by the present invention when its independent power supplies are sufficiently energized by the primary AC power source 10. Following the detection of a power-recovery condition, and the subsequent removal of the CPU B+ Control signal, the CPU regulated power supply 12 is enabled to provide its normal output to the CPU (typically achieved by switching off the dump circuit). When the output of the CPU regulated power supply 12 has stabilized, typically in less than $\tau_5$ milliseconds, the Reset signal is removed and, as a result, the CPU is uninhibited. The delay of $\tau_5$ milliseconds ensures that the CPU is not enabled until after the CPU regulated voltage has stabilized, thereby reducing the risk of data loss or error due to unstable power conditions.

The Restart signal is generated after a predetermined interval of $\tau_6$ milliseconds has elasped after the removal of the Reset signal. Interval $\tau_6$ is selected to provide sufficient time for the CPU to clear the Reset signal. The removal of the Reset signal initiates a preprogrammed start-up sequence which enables CPU operations to resume from the point at which they had been interrupted.

Although the operation of the preferred embodiment has been described in connection with a single CPU and a single CPU regulated power supply 12, it should be understood that the present invention contemplates larger system configurations; for example, multiple CPU's and their respective regulated power supplies may be configured in parallel so that a power-fail condition detected with respect to any one will cause the preprogrammed shut-down of them all.

The structure and internal operation of this preferred embodiment of the present invention are now described. With reference to FIG. 1, a transformer T1 electrically couples the output of primary AC power supply 10 to a full wave rectifier 14. Full wave rectifier 14 is typically a conventional rectifying circuit comprised of diodes CR1 and CR2, and resistors R1 and R2. Diode CR1 conducts during the positive phase of the input AC power signal while diode CR2 conducts during its negative phase. Resistors R1 and R2 provide proper interfacing with means for clipping and filtering 16 which receives as its input the full-wave rectified power signal output by the rectifier 14. A preferred means for clipping and filtering 16 is shown in FIG. 1. It is comprised of a zener diode Z1, a capacitor C26 in parallel with zener Z1 between an input point 17 and circuit ground, and resistors R3 and R4. Zener Z1 clips the full-wave power signal, while capacitor C26 charges up to the zener voltage of zener Z1. Capacitor C26 is typically sufficiently large, e.g., 6.8 $\mu f$, to provide adequate energy storage for good AC filtering. Resistor R1 serves as a series resistor for zener Z1, while resistors R2, R3 and R4 serve as bleeder resistors for capacitor C26. Resistors R3 and R4 also provide the impedance matching and voltage division necessary for interfacing with a voltage sense amplifier 20 within a voltage comparator 18.

Figure 7:
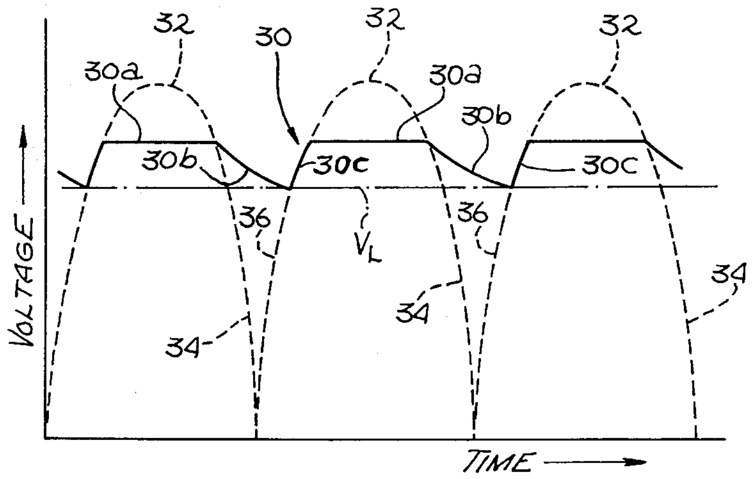
FIG. 7 is the characteristic waveform of the primary AC power signal after being rectified, clipped and filtered, said signal being compared to a reference voltage to detect a power-fail condition.

Output signal 30 produced by the clipping and filtering means 16 has a characteristic waveform which is shown in detail in FIG. 7. The flat portion 30a is the result of the clipping by zener Z1. The amplitude of the flat region 30*a* is, therefore, approximately equal to the zener voltage of zener Z1. The clipping takes place during that portion 32 of each half cycle when the amplitude of the full-wave power signal would otherwise exceed the zener voltage of zener Z1. During that portion 34 of each cycle when the full-wave power signal is less than the zener voltage of zener Z1 and decreasing, the capacitor C26 discharges through resistors R2, R3 and R4. The "sinking" portion 30*b* of signal 30 is the result of this discharging of capacitor C26. Capacitor C26 discharges until the instant when its voltage equals the amplitude of the full-wave signal during that portion 36 of the next half cycle when the full-wave power signal is less than the zener voltage of zener Z1 and increasing. From this instant until the time clipping by zener Z1 commences, the capacitor C26 is charged directly by the full-wave power signal. The "rising" portion 30*c* of signal 30 is the result of this charging. During the aforesaid interval, the voltage of waveform portion 30*c* substantially "tracks" the voltage of the full-wave signal.

Voltage $V_L$ is the lowest voltage level of signal 30. It is readily observable that the higher the RMS amplitude of the full-wave power signal, the closer voltage $V_L$ approaches the zener voltage of zener Z1; this is so because as the RMS amplitude of the AC power signal increases, the time interval during which capacitor C26 can discharge is decreased. Correspondingly, as the RMS amplitude of the AC power signal decreases, the discharge time of capacitor C26 increases, thereby lowering the magnitude of voltage $V_L$. Thus, voltage $V_L$ of signal 30 effectively translates the RMS amplitude of the primary AC power signal into a DC level.

In this preferred embodiment, the voltage comparator 18 is comprised of resistors R5 and R17; zener diode Z2; variable resistors (potentiometers) VR1 and VR2; and voltage sense amplifier 20. The voltage regulator 18 receives supply voltage $B+_1$. Zener diode Z2 is energized by voltage $B+_1$ through resistor R5. If, for example, the logic circuits and voltage sense amplifier 20 selected for this embodiment operate at approximately the 3 volt DC level, zeners Z1 and Z2 would typically have zener voltages of approximately 7.5 volts and 6.2 volts, respectively; resistors R3, R4 and R17 would be about 10*k* ohms each; and supply voltage $B+_1$ would be approximately 12 volts DC. Variable resistors VR1 and VR2 provide a simple means for deriving from zener Z2 a reference voltage which represents the minimum acceptable RMS amplitude of the primary power signal; i.e., the reference voltage is set at the value of $V_L$ which would be present if the RMS amplitude of the primary power signal were at the threshhold of being unacceptably low. Variable resistor VR1, in combination with resistor R17, enables a rough setting of the reference voltage to be made, while variable resistor VR2 provides a fine adjustment.

The signal 30 and the reference voltage are inputs to voltage sense amplifier 20 on legs 1 and 2, respectively. The output of voltage sense amplifier 20 (and, therefore, of the voltage comparator 18) is either one of two states, high or low voltage. Typically, the high voltage is +3 volts DC and the low voltage is approximately 0 volts, defined herein as binary 1 and binary 0, respectively. The output of voltage sense amplifier 20 is as follows: when the voltage on leg 1 (the signal 30) is equal to or greater than the voltage on leg 2 (the reference voltage), the output of voltage sense amplifier 20 is binary 1 (high); when the voltage on leg 1 falls below the reference voltage, the output of the voltage sense amplifier 20 is binary 0 (low). Thus, the presence of a binary 0 at the output of voltage sense amplifier 20 is the first indication of a power-fail condition. However, as will be more fully explained hereinbelow, such an indication alone is insufficient to generate a Power-Fail signal. The power-fail indication must persist for, or recur within, predetermined time intervals established by timing and delay means 22. A voltage sensing amplifier having a transfer function such as the described above for voltage sense amplifier 20 is known and available in the art, typically in integrated circuit modules.

Figure 2:
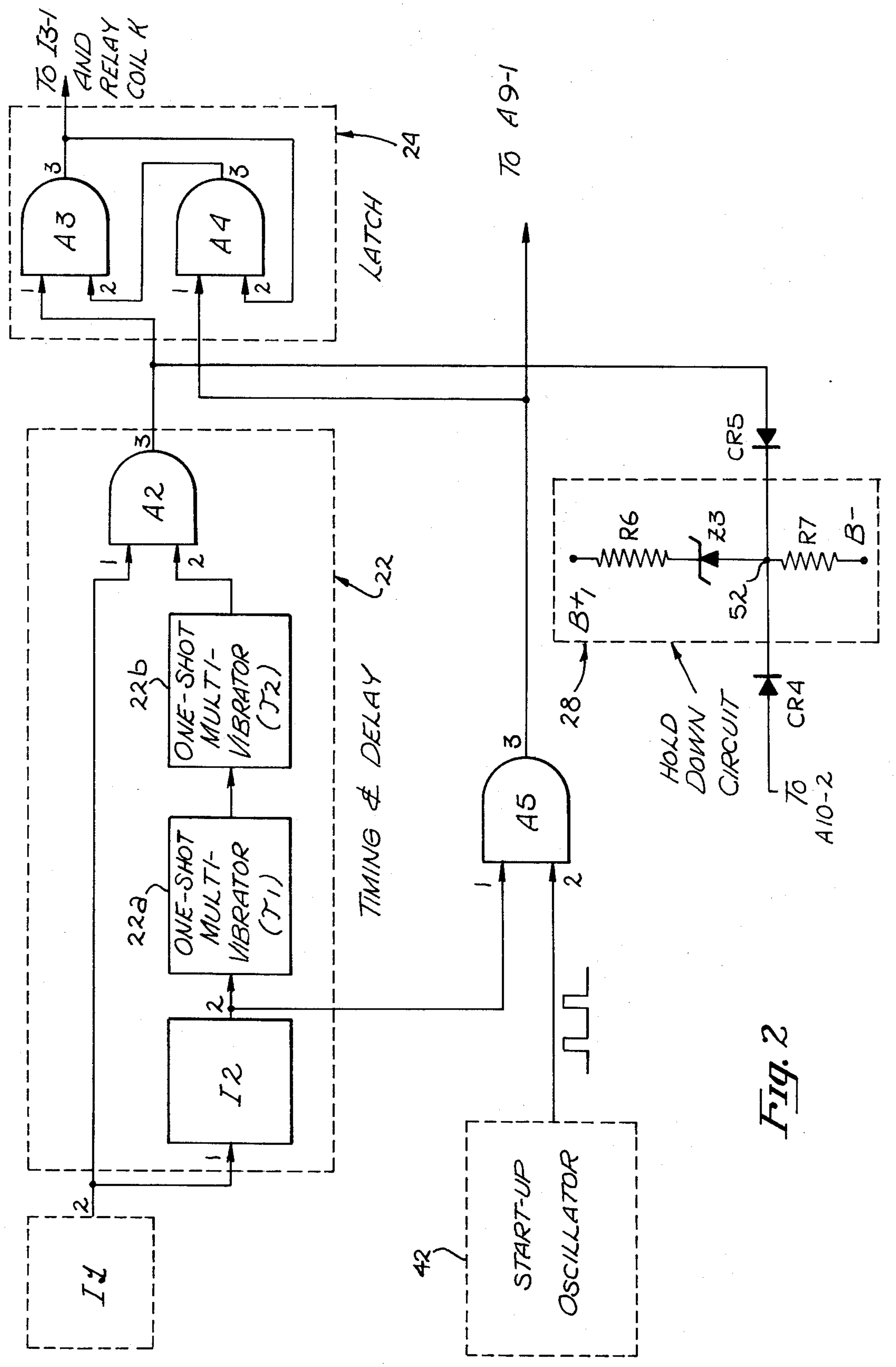
Figure 8:
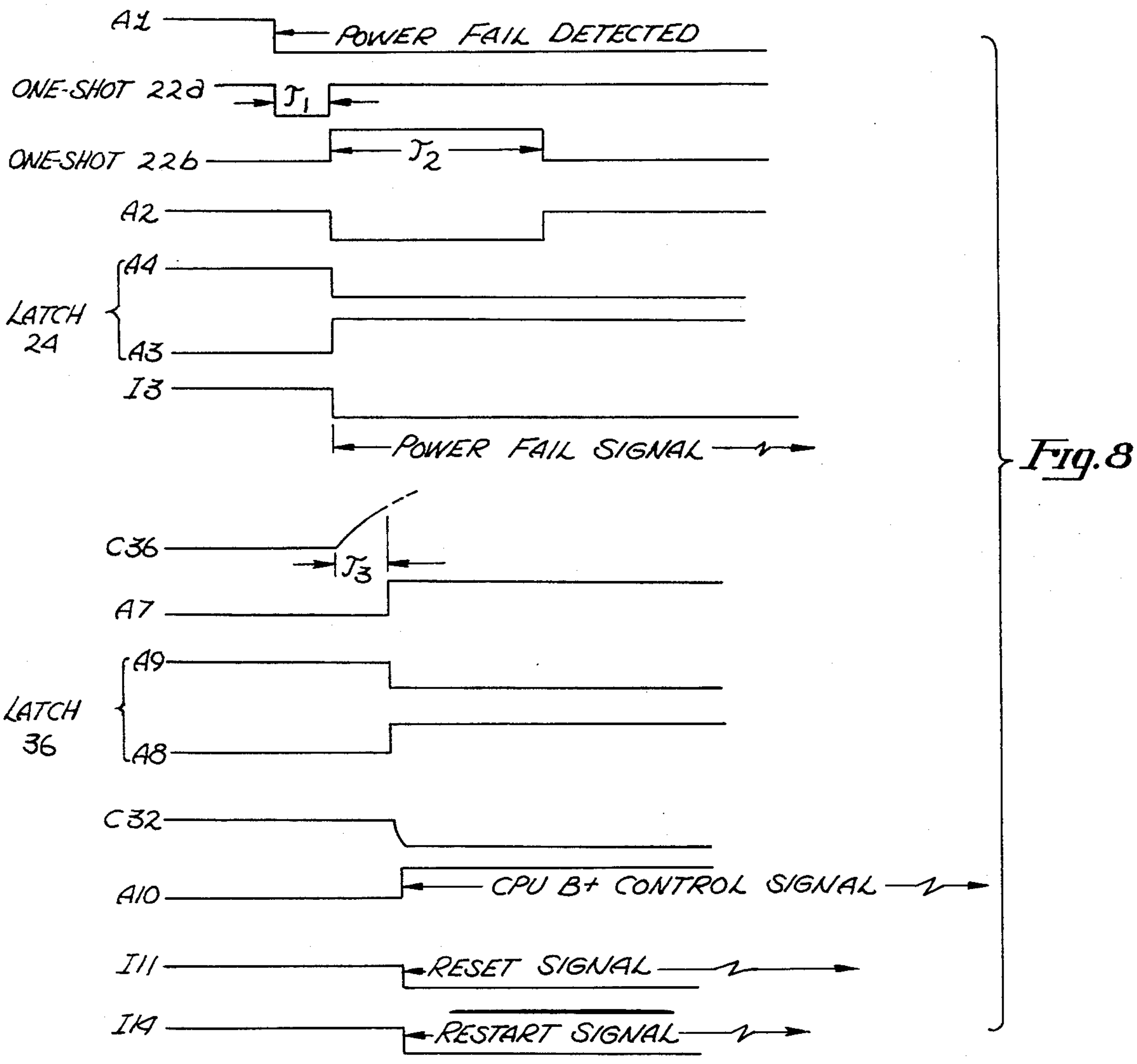
FIG. 8 is a timing diagram showing several signals during a power-fail condition.

With reference to FIGS. 2 and 8, the timing and delay means 22 is described. In this preferred embodiment, timing and delay means 22 is comprised of an inverter I2, two serial one-shot multivibrators, 22*a* an 22*b*, and a NAND gate A2. The purpose of the timing and delay means 22 is to discriminate power-fail conditions which require a CPU shut-down from random, short-term power line variations which are not likely to cause data loss or errors in the CPU.

A power-fail indication from the voltage comparator 18 generates a Power-Fail signal only when the indication can cause a change of state of the ouptut of the NAND gate A2. Under normal conditions, the output of the one-shot 22*b* is binary 0. Therefore, the output of the gate A2 is normally binary 1. In order to bring about a change in the output state of gate A2, a binary 1 must appear concurrently on each of its legs A2–1 and A2–2. As indicated above, when the voltage comparator 18 detects a potential power-fail condition, its output goes to binary 0. An inverter I1 is placed serially between the output of voltage comparator 18 and leg A2–1 inverts the binary 0 to binary 1. However, at this instant the signal at leg A2–2 is still a binary 0 and the output of gate A2 does not change state. The binary 1 at I1–2 is inverted by an inverter I2 which is in series with one-shots 22*a* and 22*b*. One-shot 22*a* is adapted to fire on the change of state of I2 from a binary 1 to a binary 0. One-shot 22*a*, in its quiescent state, has an output which is normally binary 1. When triggered, the output of one-shot 22*a* goes to binary 0 for a period of $\tau_1$. In a typical computer application, $\tau_1$ is selected to be approximately 2 milliseconds. Serial one-shot 22*b* is adapted to fire on the change of state of one-shot 22*a* from binary 0 to binary 1. Thus, at the end of the period $\tau_1$, one-shot 22*a* triggers the firing of one-shot 22*b*. One shot 22*b*, in its quiescent state, has an output which is normally binary 0. When triggered, the output of one-shot 22*b* goes to binary 1 for a period of $\tau_2$; $\tau_2$ is approximately 8 milliseconds in this embodiment. Thus, during the period $\tau_2$ a binary 1 appears on leg A2–2. If the power-fail indication which originally caused the tandem firing of one-shots 22*a* and 22*b* (i.e., the binary 1 at I1–2) is still present or if it recurs at any time during the period $\tau_2$, the output of gate A–2 (at A2–3) will change to a binary 0. The requirement that the power-fail indication either (i) persist for period $\tau_1$, or (ii) after period $\tau_1$, recur during period $\tau_2$, provides the requisite discrimination suitable to the CPU application.

A latch 24 is utilized to store the fact that a power-fail condition has been detected. In this embodiment, latch 24 is comprised of NAND gates A3 and A4 configured as shown in FIG. 2. The input legs A3–1 and A3–2 of gate A3 are connected to A2–3 and to A4–3, respectively. Under normal power conditions, legs A3–1 and A3–2 are each at binary 1. Thus, the output of gate A3 is at binary 0. Input legs A4–1 and A4–2 of gate A4 are connected to the output of a NAND gate A5 and to A3–3, respectively. As will be explained hereinbelow, leg A4–1 is at binary 1 at all times except during the presence of start-up pulse, while leg A4–2 is at binary 0. Thus, the output of gate A4 is at binary 1. The output of latch 24 is taken at leg A3–3. When A2–3 changes from a binary 1 to a binary 0 (indicating the detection of a power-fail condition), the output of latch 24 changes to a binary 1 while the output of gate A–4 changes to a binary 0. This is a stable condition for latch 24 and it remains in this state until reset by a start-up pulse when a power-recovery condition is detected. The use of a latch 24 precludes the operation of the CPU under a power condition close to threshhold; i.e., where the RMS amplitude of the AC primary power source wanders randomly between levels just above and just below threshhold. If the drop below threshhold lasts for a duration at least as long as period $\tau_1$, or if the drop recurs at least once during the period $\tau_2$, latch 24 is switched and, as will be seen, a Power-Fail signal is generated, the latter initiating the shut-down sequence.

Figures 3, 5:
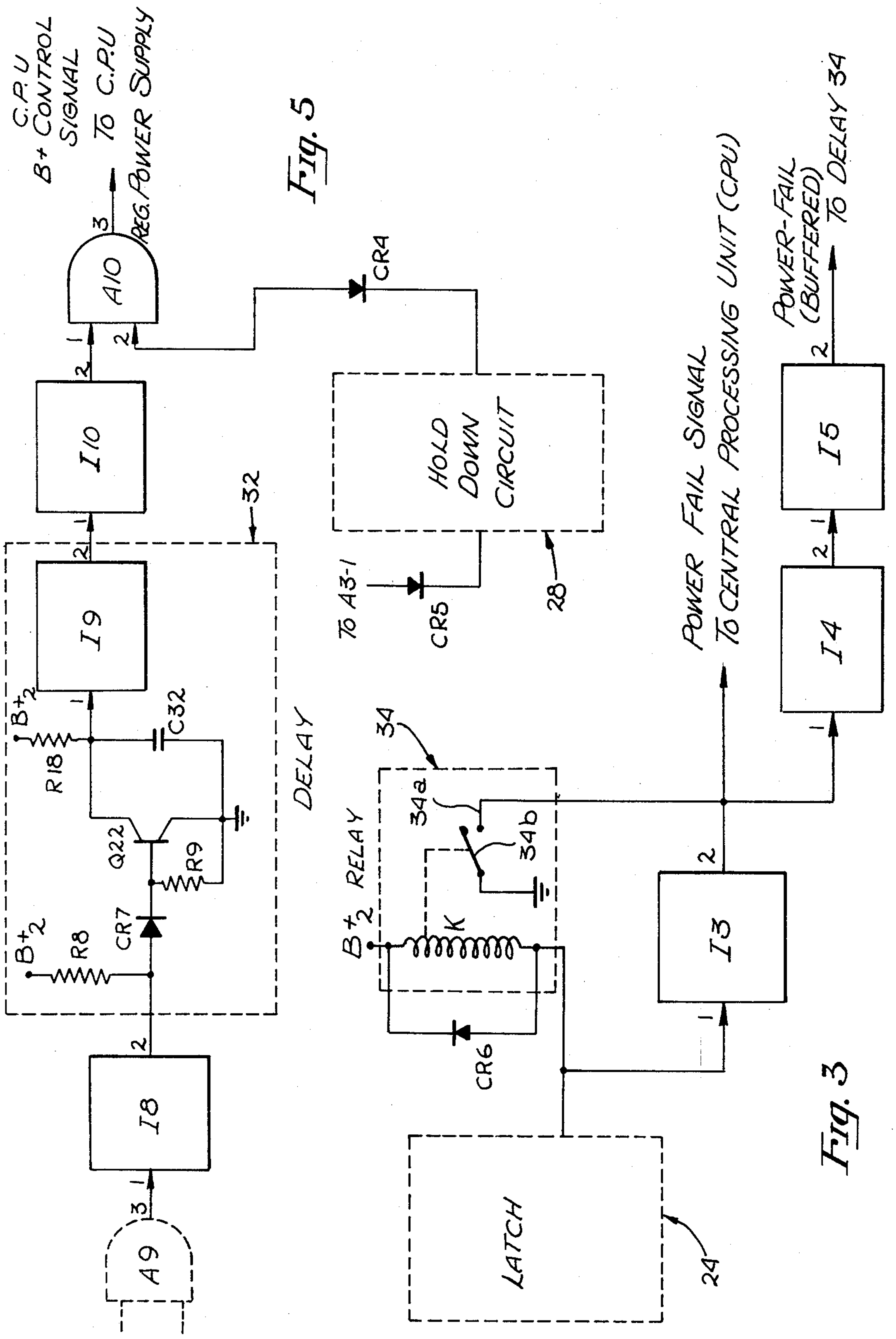

With reference to FIG. 3, the generation of the Power-fail signal is described. As explained above, the detection of a power-fail condition causes the output of latch 24 to go to binary 1. A serial inverter I3 serves as an output buffer; thus, the Power-Fail signal in this embodiment appears as a binary 0 to the CPU. In order to ensure a "hard" binary 0 for the duration of the power-fail condition, output I3–2 of inverter I3 is connected to a fixed contact 34*a* of a magnetically biased relay 34. The movable contact 34*b* of relay 34 is connected to circuit ground. When a coil K of relay 34 is unenergized, movable contact 34*b* springs to electrical contact with contact 34*a*. When coil K is energized, movable contact 34*b* is pulled away from contact 34*a*. Under normal power conditions, the output of latch 24 is a binary 0; thus, coil K is energized by supply voltage $B+_2$ (typically 5 volts DC), and contacts 34*a* and 34*b* are open. However, when a power-fail condition causes the output of latch 24 to change to a binary 1 (typically 3 volts DC), the coil is sufficiently deenergized to allow contacts 34*a* and 34*b* to close, thereby providing a "hard" binary 0 as the Power-Fail signal. Diode CR6 is placed in parallel with coil K to eliminate electrical noise when the field in coil K collapses. The operation of latch 24 and the generation of the Power-Fail signal are further illustrated in time relation in FIG. 8.

The Power-Fail signal is used internally to generate the CPU B+ Control signal. Inverters I4 and I5 are utilized to buffer the CPU from the internal elements which receive the Power-Fail signal. Two inverters (I4 and I5) are required in order to avoid an inversion of the binary state of the Power-Fail signal; i.e., the binary 0.

The present invention also discloses the use of a hold-down circuit 28 shown in FIG. 2 to provide assurance that the Power-Fail signal will not be inadvertently removed as a result of the electrical power transient which occurs when B+ power to the invented system falls off. This could occur, if, under unstable power conditions, a binary 1 happens to appear, even momentarily, on both legs A3–1 and A3–2 of gate A3. In this event, latch 24 would reset to the binary state indicative of normal power conditions; i.e., the output of latch 24 would return to binary 0 and the Power-Fail signal would be removed. Hold down circuit 28 comes into operation when B+ power to the present invention falls below a predetermined level; from then on, until power recovers, circuit 28 acts to hold leg A3–1 at a voltage level close to that which represents binary 0, thereby preventing the resetting of latch 24. Hold-down circuit 28 comprises a zener diode Z1 and resistors R6 and R7. The cathode side of zener Z1 is connected to supply voltage $B+_1$ through resistor R6, while its anode side is connected to supply voltage B– through resistor R7. $B+_1$ an B– are typically 12 volts and –6 volts DC, respectively; the zener voltage of zener Z1 is approximately 9.1 volts. Leg A3–1 is coupled to a point 52 in hold-down circuit 28 through diode CR5. As long as supply voltage $B+_1$ is above 9.1 volts, the zener Z3 breaks down and, by appropriate selection of the values of R6 and R7, the voltage at point 52 can be made greater than 3 volts. Under these conditions, diode CR5 is back biased and hold-down circuit 28 is effectively isolated from leg A3–1. However, when voltage $B+_1$ falls below 9.1 volts, zener Z3 stops conducting. From this time until the recovery of power, the voltage at point 52 is determined by the voltage from the B– supply and the value of resistor R7. During the power transient there is typically sufficient residual negative voltage from the B– supply to hold the voltage at point 52 close to zero volts; i.e., to a binary zero.

Figure 4:
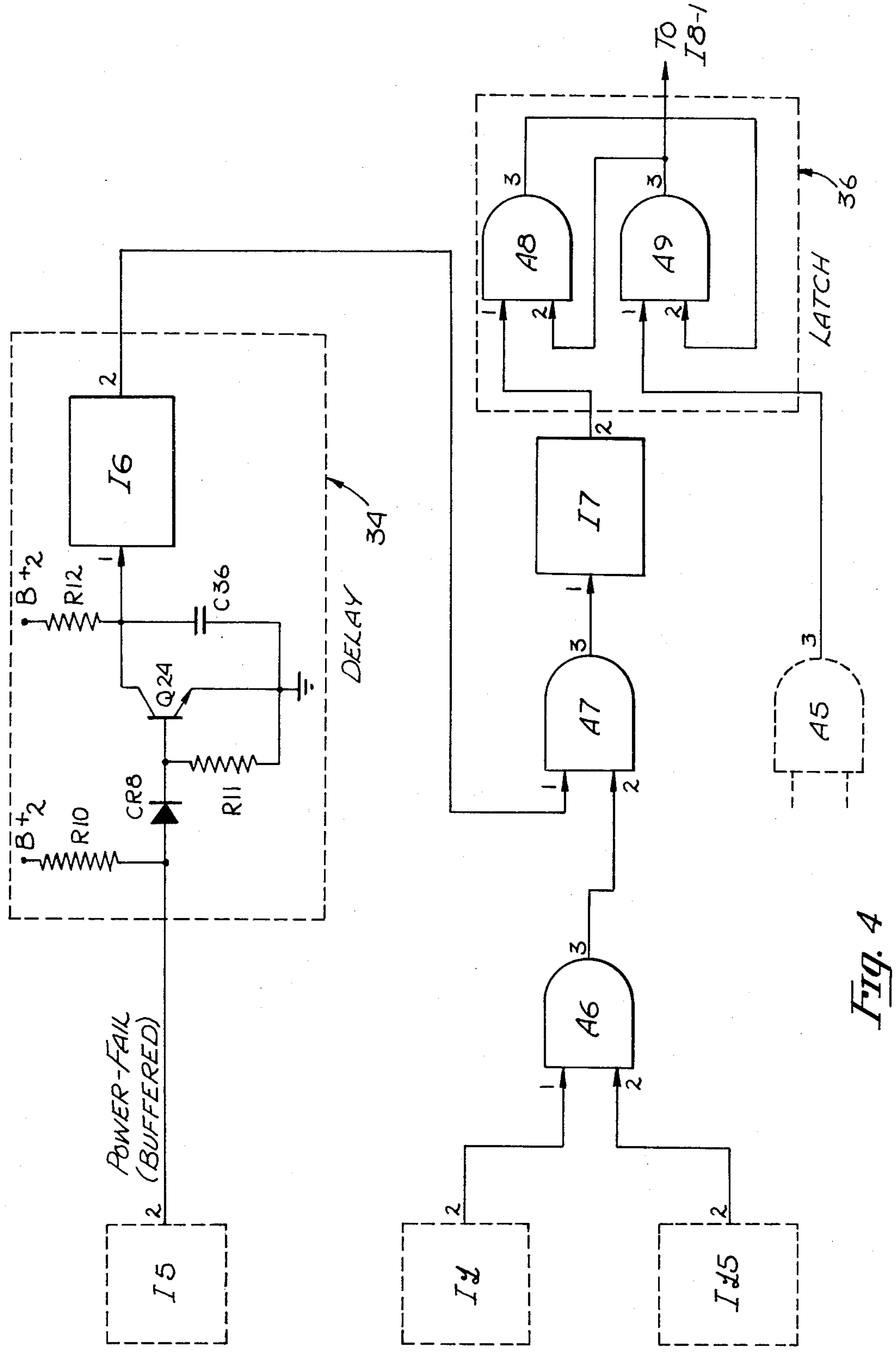

With reference to FIGS. 4, 5 and 8, the generation of the CPU B+ Control signal is described. The buffered Power-Fail signal from I5–2 is routed to a delay means 34. A preferred implementation of delay means 34 is shown in FIG. 4. It comprises resistors R10, R11, and R12; diode CR8; transistor Q24; capacitor C36 and inverter I6. Power is from the B+$_2$ supply, typically 5 volts. Resistor R11 is a base resistor for transistor Q24. The collector of transistor Q24 is coupled to B+$_2$ through resistor R12. In addition, the collector of transistor Q24 is connected to the input leg I6–1 of inverter I6. Capacitor C36 is connected between the collector of transistor Q24 and circuit ground. The output of the delay means 34 is the leg I6–2 of inverter I6. Under normal power conditions, the output of inverter I5 is a binary 1 (i.e., the absence of a Power-Fail signal). The output of inverter I5 is coupled to the base of transistor Q24 through diode CR8. When I5–2 is at binary 1, the diode CR8 is forward biased and base current from B+$_2$ flowing through resistor R10 maintains transistor Q24 in a conducting state. Thus, under normal power conditions, the voltage on capacitor C36 is kept close to zero volts. However, when a Power-Fail signal is generated, the binary state of I5–2 changes to a binary 0. This causes diode CR8 to become back-biased, thereby cutting off the base current to transistor Q24. As a result, transistor Q24 stops conducting and capacitor C36 starts to charge toward B+$_2$ volts through resistor R12. When the voltage on capacitor C36 reaches the level of a binary 1, the output of inverter I6 (and, therefore, of delay means 34), changes to a binary 0. In this way a delay $\tau_3$ is introduced between the appearance of the Power-Fail signal and the CPU B+ Control signal. For computer applications, $\tau_3$ typically equals about 3 milliseconds.

The output of delay means 34 is connected to leg A7–1 of a NAND gate A7. Up to this time in the sequence of events, the input at leg A7–2 is a binary 1 (for reasons which will become apparent later). Prior to the detection of a power-fail condition, the output of delay means 34 is also a binary 1. Thus, the output of gate A7 is a binary 0. This is inverted by an inverter I7, the output of which is connected to an input A8–1 of a latch 36. Latch 36 in this embodiment is comprised of NAND gates A8 and A9 configured as shown in FIG. 4. Latch 36 operates in a manner exactly like that of latch 24. Under normal power conditions the output I7–2 of inverter I–7 is a binary 1 and the output of latch 36 at A9–3 is a binary 1. As was the case with latch 24, output A5–2 is connected to input A9–1 of latch 36. At all times except when an internal start-up pulse is present, A5–3 is a binary 1. When the generation of a Power-Fail signal causes the output of delay means 34 to change to a binary 0 (after delay $\tau_3$), the output of gate A7 changes from a binary 0 to a binary 1. Following inversion by inverter I7, a binary 0 is input to latch 36 at A8–1. This causes the latch 36 to change its state from a binary 1 to a binary 0.

With reference to FIG. 5, the output of latch 36 is connected to the input of an inverter I8. Inverter I8, in turn, drives a delay means 32. Delay means 32 is comprised of resistors R8, R9 and R18; transistor switch Q22; diode CR7; capacitor C32; and inverter I9 configured as shown in FIG. 5. Delay means 32 operates in the same manner as delay means 34 described hereinabove. When power conditions are normal, the output of inverter I8 (at I8–2) is a binary 0. Consequently, diode CR7 is back biased, transistor Q22 is in a non-conducting state, and capacitor C32 is charged to B+$_2$ volts. The input to inverter I9 is, therefore, a binary 1, causing the output of delay means 32 to be a binary 0. Delay means 32 is connected to an inverter I10 whose output, under normal power conditions, is a binary 1. The output of inverter I10 is connected to leg A10-1 of a NAND gate A10. The output of gate A10, in turn, is connected to the high power dump circuit. A second leg A10–2 of gate A10 is coupled to hold down circuit 28 through a diode CR4. When power is normal, diode CR4 is back biased and the hold-down circuit is effectively decoupled from leg A10–2. Thus, the output of gate A10 is determined solely by the input on leg A10–1. Since, under normal power conditions, the input to leg A10–1 is binary 1, the output at leg A10–3 is binary 0. When a binary 0 is present at leg A10–3, the CPU power dump circuit remains unactivated.

When a power-fail condition causes the output of latch 36 to change to a binary 0 as explained hereinabove, the following events take place: (i) the output of inverter I8 changes to a binary 1; (ii) transistor Q22 goes into conduction; (iii) capacitor C32 discharges very rapidly through transistor Q22; (iv) the output of inverter I9 changes to a binary 1; (v) the output of inverter I10 changes to a binary 0; and (vi) the output of leg A10–3 of gate A10 changes to a binary 1. A binary 1 at leg A10–3 constitutes the CPU B+ Control signal. It causes the output of the CPU regulated power supply 12 to be rapidly shut-down by activation of the power dump circuit. Since the shut-down of the CPU regulated power supply 12 occurs an interval $\tau_3$ after the appearance of the Power-Fail signal, the CPU has sufficient time to complete its preprogrammed shut-down sequence. By shutting down the CPU regulated power supply 12 at this time, the data and program stored in the CPU memory is safeguarded by precluding the appearance of transient read or write currents which might otherwise occur if the CPU regulated power supply 12 were allowed to remain "on" while the primary AC power source 10 is in an unstable condition.

As described above, hold-down circuit 28 comes into play when the B+ power to the present invention falls off. Thus, when a power-fail condition has generated a CPU B+ Control signal at leg A10–3 (a binary 1), hold-down circuit 28 ensures the maintenance of that signal by holding leg A10–2 at close to zero volts (a binary 0).

It should be noted that delay means 32 did not introduce any appreciable delay in the above-described sequence of events. As will be seen later, delay means 32 introduces a required delay during the start-up sequence.

Figure 6:
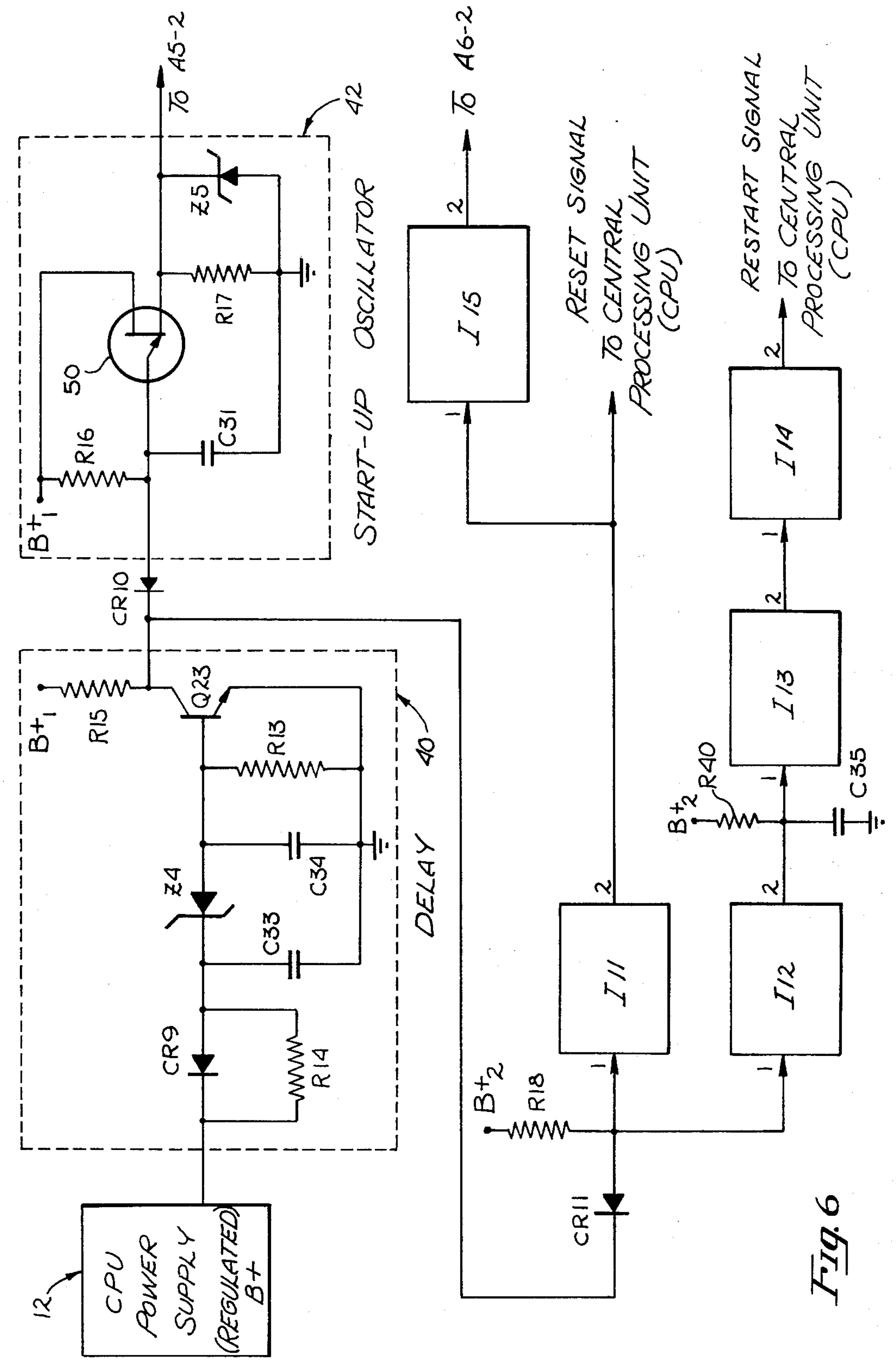
Figure 9:
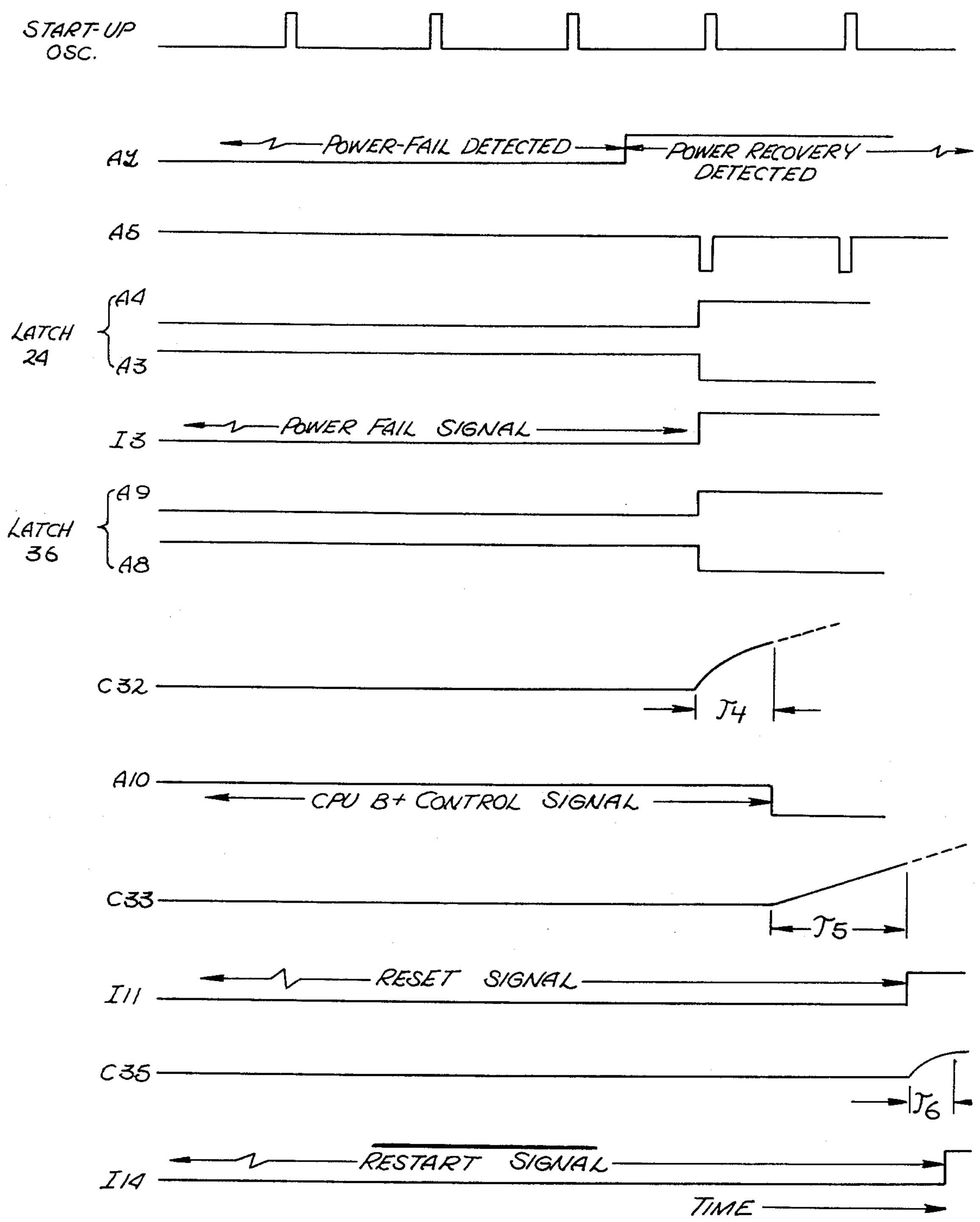
FIG. 9 is a timing diagram showing several signals during a power-recovery condition.

With reference to FIGS. 6 and 9, the generation of the Reset and Restart signals is described. A delay means 40 is connected to the CPU regulated power supply 12. Delay means 40 is comprised of transistor switch Q23, base resistor R13, collector resistor R15, zener diode Z4, energy storing capacitor C33 (typically 180 $\mu f$), noise suppressing capacitor C34, charging resistor R14 and discharging diode CR9 configured as shown in FIG. 6. Prior to the generation of the CPU B+ Control signal, capacitor C33 is charged through resistor R14 to the CPU B+ voltage. Zener Z4 is selected to have a zener voltage less than the CPU B+. Thus, during this time, zener Z4 is conducting and providing base current into transistor Q23. As a result, transistor Q23 is in a conducting state. The output of delay means 40 is taken at the collector of transistor Q23 and connected to inverters I11 and I12 and a start-up oscillator 42 through isolating diodes CR11 and CR10, respectively. When transistor Q23 is conducting, legs I11–1 and I11–2 are both at a binary 0. The output of gate I11 (leg I11–2) is, therefore, at a binary 1, which represents to the CPU the absence of the Reset signal. The output of gate I12 is also a binary 1. Following double inversion by inverters I13 and I14, output leg I14–2 of inverter I14 is a binary 1, which represents to the CPU the presence of the Restart signal.

The logic conditions just described exist prior to the generation of the CPU B+ Control signal. However, when the CPU B+ Control signal causes the shut-down of the CPU regulated power supply 12, the following sequence of events occurs: (i) capacitor C33 in delay means 40 discharges rapidly through diode CR9 into the power dump circuit; (ii) zener Z4 stops conducting, cutting off the base current into transistor Q23; (iii) transistor Q23 stops conducting; and (iv) a binary 1 appears at legs I11–1 and I12–1. The output of inverter I11 goes to a binary 0 which constitutes the Reset signal; and the output of inverter I14 also goes to a binary 0 which constitutes the absence of the Restart signal.

The output of delay means 40 controls the operation of the start-up oscillator 42. The start-up oscillator 42 is basically a relaxation oscillator. A typical circuit comprises a unijunction 50; resistors R16 and R17; zener diode Z5; and capacitor C31; configured as shown in FIG. 6. Prior to the appearance of the CPU B+ Control signal, transistor Q23 of delay means 40 is in a conducting state. Thus, the base of unijunction 50 is clamped to ground through diode CR10, and the unijunction 50 is inactive. However, when the CPU B+ Control signal causes the shut-down of the CPU regulated power supply 12, transistor Q23 cuts off, and its collector rises to $B+_1$ volts. Diode CR10 becomes back biased, enabling capacitor C31 to charge through resistor R16 until it reaches the voltage which fires the unijunction 50. When the unijunction 50 fires, it conducts current through resistor R17 until it is cut off by the discharge of capacitor C31. Thus, a positive pulse train appears at the output of the start-up oscillator 42. Its peak is clipped by zener diode Z5. A suitable frequency for the start-up pulse train is typically 50 cps. The utilization of the start-up pulse train is described hereinbelow in connection with the start-up sequence of events.

With reference to FIG. 4, the operation of NAND gate A6 is now explained. The inputs to gate A6 are as follows: the output of inverter I1 is connected to leg A6–1 and the output of an inverter I15 is connected to leg A6–2. The inverter I15 provides the inverted Reset signal while isolating the CPU from the gate A6. When a power-fail condition has been detected, the output of inverter I1 becomes a binary 1, while the output of inverter I15 remains at its normal state (a binary 0) until the appearance of the Reset signal when it becomes a binary 1. Thus, until the Reset signal appears, the output of gate A6 is a binary 1. When the Reset signal causes I15-2 to go to a binary 1, the output of gate A6 goes to binary 0, provided that a power-fail condition is detected; i.e., provided the output of inverter I1 is still a binary 1. A binary 0 at leg A6–3 causes gate A7 to output a binary 1, which in turn causes latch 36 to be set to its power-fail state. Thus, after the Reset signal appears, gate A7 can directly cause the setting of latch 36 whenever a power-fail condition is detected, without the delays introduced by timing and delay means 22 ($\tau_1$ and $\tau_2$) and delay means 34 ($\tau_3$). Prior to the Reset signal, the only signal path to latch 36 is through the aforesaid means for delay. The reason for providing a direct signal path from inverter I1 to latch 36 after the Reset signal appears is explained as follows: When the detection of a power-fail condition by the voltage comparator 18 is intermittent, as when the amplitude of the primary AC power source is close to threshhold, the latch 36 may be reset from time to time to its "normal power" state by a start-up pulse passed by gate A6. This would cause the removal of the CPU B+ Control signal, after a delay $\tau_4$, and enable the reactivation of the CPU regulated power supply 12. Under such unstable power conditions, it is desirable not to allow the restart sequence of events to commence, since a Restart signal could be followed by a transient-induced shutdown of the CPU regulated power supply 12 without the bookkeeping delay time $\tau_3$. Thus, after the Reset signal appears, whenever a power-fail condition is indicated by the voltage comparator 18, the above described signal path enables latch 36 to be immediately set to its power-fail state, resulting in the reappearance of the CPU B+ Control signal. When, however, the voltage comparator 18 fails to indicate a power-fail condition for a time period sufficient to allow the restart sequence of events to proceed to where the Reset signal is removed, then the setting of latch 36 to its power-fail state can only occur following the appearance of a subsequent Power-Fail signal.

With reference to FIGS. 2–4, 6 and 9, the start-up sequence of events is described. As described above, the start-up oscillator begins to output positive start-up pulses immediately following the shut-down of the CPU regulated power supply 12. When a power-recovery condition is detected, the start-up pulses are passed through NAND gate A5 to legs A4–1 and A9–1 of latches 24 and 36, respectively. The appearance of a start-up pulse on the aforesaid legs of latches 24 and 34 causes these latches to be reset to their respective states under normal power conditions. Input leg A5–2 of gate A5 is connected to the output of the start-up oscillator 42. Input leg A5–1 is connected to the output I2–2 of inverter I2. During a power-fail condition, the input at leg A5–1 is a binary 0; thus, the output of gate A5 is a binary 1, and the start-up pulses are inhibited by gate A5. However, when a power-recovery condition is detected, the input at leg A5–1 becomes a binary 1. When a start-up pulse appears, the input at leg A5–2 becomes a binary 1 for the duration of the pulse. Consequently, the output of gate A5 goes to a binary 0 during the existence of each start-up pulse. The presence of a binary 0 at the output of gate A5, even for the short pulse duration, resets latches 24 and 36 to their respective states under normal power conditions. When so reset the output of latch 24 (A3–3) goes to a binary 0. After inversion by inverter I3, the logic state at leg I3–2 becomes a binary 1, which represents the removal of the Power-Fail signal. In addition, coil K of relay 34 is fully energized and contacts 34*a* and 34*b* are pulled apart. A binary 1 at leg I3–2 produces a binary 1 at leg I5–2. As a result, transistor Q24 of delay means 34 goes into conduction, causing (i) capacitor C36 to discharge rapidly, and (ii) the output of delay means 34 to become a binary 1. With capacitor C24 discharged, delay means 34 is in a ready state for operation in response to any subsequent Power-Fail signal; i.e., it is ready to cause the required delay $\tau_3$ between the appearance of the Power-Fail signal and the CPU B+ Control signal.

When latch 36 is reset to its state under normal power conditions, its output at leg A9–3 is a binary 1.

After inversion by inverter I8, a binary 0 appears at the input to delay means 32, causing transistor Q22 to stop conducting. As a result, capacitor C32 begins charging toward B+$_2$. After a period of $\tau_4$, the voltage on capacitor C32 reaches the level of a binary 1 and the output of the delay means 32 becomes a binary 0. After serial inversion by inverter I10 and gate A10, the binary state of leg A10–3 is a binary 0, which constitutes the removal of the CPU B+ Control signal. The values of C32 and R18 are typically selected to obtain a $\tau_4$ of approximately 60 milliseconds. The purpose of this start-up delay is to ensure that the power-recovery indication is stable and to allow all CPU power supplies (except supply 12) to settle into regulation, particularly on initial turn-on.

The removal of the CPU B+ Control signal reactivates the CPU regulated power supply 12. With reference to FIG. 6, the removal of the Reset signal and the generation of the Restart signal are now described. Capacitor C33 of delay means 40 charges to the CPU B+ voltage through resistor R14. After a delay $\tau_5$, the voltage on capacitor C33 reaches a voltage in excess of the zener voltage of zener Z4. The zener Z4 breaks down and transistor Q23 goes into conduction, causing the output of delay means 40 to go to a binary 0. A binary 0 at the output of delay means 40 in turn produces a binary 1 at leg I11–2, the latter constituting the removal of the Reset signal. Resistor R14 and capacitor C33 are selected to produce a delay, $\tau_5$, which is in the range of 150–200 milliseconds. The purpose of this delay ($\tau_5$) is to ensure that the CPU B+ voltage has stabilized before removing the Reset signal which enables the CPU to begin its preprogrammed start-up sequence. The inclusion of a capacitor C35 and a resistor R40 between inverters I12 and I13 introduces an additional delay $\tau_6$ between the removal of the Reset signal and the generation of the Restart signal at leg I14–2. This additional delay allows the CPU time to clear the Reset signal before normal CPU operations are resumed.

Although this invention has been disclosed and described with reference to a particular embodiment, the principles involved are susceptible of other applications which will be apparent to persons skilled in the art. In addition, those skilled in the art may utilize equivalent logic to implement the functions taught by the present invention. This invention, therefore, is not intended to be limited to the particular embodiment herein disclosed.

I claim:

1. A system for detecting the presence and absence of power-fail conditions in a primary power source and issuing responsive signals to an operating system which derives power from said primary power source, said signals enabling said operating system to shut-down its operation in a predetermined manner when a power-fail condition is detected, and to start-up its operation in a predetermined manner when a power-recovery condition is detected after a shut-down comprising:

a. means for deriving a reference voltage whose amplitude represents a minimum acceptable amplitude of said primary power source voltage;

b. means for comparison of said primary power source voltage with said reference voltage, said primary power source and said means for deriving a reference voltage being electrically coupled to said means for comparison, said means for comparison being adapted to provide at its output a power-fail signal when said primary power source voltage is less than said reference voltage, and a power-recovery signal when said primary power source voltage is equal to or greater than said reference voltage;

c. a first one-shot pulse generator electrically coupled to said output of said means for comparison, said first one-shot pulse generator being adapted to provide at its output a single pulse of duration $\tau_1$ in response to each appearance of said power-fail signal;

d. a second one-shot pulse generator electrically coupled to said output of said first one-shot pulse generator, said second one-shot pulse generator being adapted to provide at its output a single pulse of duration $\tau_2$ in response to the trailing edge of each pulse provided by said first one-shot pulse generator;

e. a first gate having first and second input legs, said first and second input legs thereof being electrically coupled to (i) said output of said means for comparison, and (ii) said output of said second one-shot pulse generator, respectively, said first gate being adapted to provide at its output said power-fail signal if and only if said power-fail signal is present at said first input leg thereof contemporaneously with the presence of a pulse generated by said second one-shot generator at said second input leg thereof;

f. a first latch electrically coupled to said output of said first gate, said first latch having an output which is in either of first or second binary states, said first and second binary states representing said power-fail and power-recovery signals respectively, said output of said first latch assuming said first binary state when said power-fail signal appears at said output of said first gate;

g. first means for electrically coupling said output of said first latch to said operating system;

h. first means for delay electrically coupled to said output of said first latch, said first means for delay providing at its output said power-fail signal after a delay of duration $\tau_3$;

i. a second gate having first and second input legs, said first input leg thereof being electrically coupled to said output of said first means for delay, said second gate being adapted to provide at its output said power-fail signal when said power-fail signal appears at said first input leg thereof;

j. a second latch electrically coupled to said output of said second gate, said second latch having an output which is in either of first or second binary states, said first and second binary states representing said power-fail and power-recovery signal respectively, said output of said second latch assuming said first binary state when said power-fail signal appears at said output of said second gate;

k. second means for delay electrically coupled to said output of said second latch, said second means for delay being adapted to provide at its output (i) said power-fail signal with substantially no delay when said output of said second latch assumes said first binary state, and (ii) said power-recovery signal after a delay of duration $\tau_4$ following the assumption by said output of said second latch of said second binary state;

l. second means for electrically coupling said output of said second means for delay to a power dump circuit adapted to (i) shut-down at least one power supply of said operating system when said power-fail signal appears at said output of said second means for delay, and (ii) to activate said power supply when said power-recovery signal appears at said output of said second means for delay;

m. third means for delay electrically coupled to said power supply of said operating system, said third means for delay being adapted to provide at its output (i) a power-off signal with substantially no delay following the shut-down of said power supply, and (ii) a power-on signal after a delay of duration $\tau_5$ following the activation of said power supply;

n. third means for electrically coupling said output of said third means for delay to said operating system;

o. fourth means for delay electrically coupled to said output of said third means for delay, said fourth means for delay being adapted to provide at its output (i) said power-off signal with substantially no delay, and (ii) said power-on signal after a delay of duration $\tau_6$ following the appearance of said power-on signal at said output of said third means for delay;

p. fourth means for electrically coupling said output of said fourth means for delay to said operating system;

q. a start-up oscillator electrically coupled to said output of said third means for delay, said start-up oscillator being adapted to provide at its output a train of start-up pulses when said power-off signal appears at said output of said third means for delay;

r. a third gate having first and second input legs, said first and second input legs thereof being electrically coupled to (i) said output of said means for comparison, and (ii) said output of said start-up oscillator, respectively, said third gate being adapted to provide at its output said train of start-up pulses if and only if said power-recovery signal is present at said first input leg thereof contemporaneously with the presence of said pulses at said second input leg thereof; said output of said third gate being electrically coupled to said first and second latches, said outputs of said first and second latches assuming said second binary state when said start-up pulse appears at said output of said third gate;

s. a fourth gate having first and second input legs, said first and second input legs thereof being electrically coupled to (i) said output of said means for comparison, and (ii) said output of said third means for delay, respectively, said fourth gate being adapted to provide at its output said power-fail signal if and only if said power-fail signal is present at said first input leg thereof contemporaneously with the presence of said power-off signal at said second input leg thereof; said output of said fourth gate being electrically coupled to said second input leg of said second gate, said second gate being adapted to provide at its output said power-fail signal when said power-fail signal appears at said second input leg thereof; and t. a DC power source, said DC power source deriving its power from said primary power source.

2. The responsive power-fail detection system of claim 1 having in addition thereto:

i. means for rectifying;

ii. means for filtering; and iii. means for clipping said primary power source voltage when said primary power source is AC.

3. The responsive power-fail detection system of claim 1 having in addition thereto means for holding any point to which it is electrically coupled to a voltage which simulates the presence of a power-fail signal when said DC power source drops below a predetermined level, said means for holding being electrically coupled to (i) said output of said first gate, and (ii) to second said means for electrically coupling, thereby ensuring (i) that said output of said first latch remains in said first binary state, and (ii) that said power-fail signal is coupled to said power dump circuit during period when said DC power source drops below said predetermined level.

4. The responsive power-fail detection system of claim 1 having in addition thereto a magnetically biased relay having a coil which is electrically coupled to said output of said first latch and at least two contacts which are arranged and configured to provide to said operating system said power-fail signal when said coil is unenergized and said power-recovery signal when said coil is energized, said coil being unenergized when said output of said first latch is in said first binary state and energized when said output of said first latch is in said second binary state.

5. The responsive power-fail detection system of claim 1 wherein each of said first, second, third and fourth gates is a NAND gate comprised of integrated diode-transistor logic circuits and wherein each of said first, second, third and fourth means for electrically coupling comprises at least one inverter, said inverter being comprised of integrated diode-transistor logic circuits.

6. The responsive power-fail detection system of claim 1 wherein all of said NAND gates, inverters and means for delay are binary devices having first and second states, and said power-fail and power-recovery signals are represented by said first and second states respectively.

7. The responsive power-fail detection system of claim 1 wherein said means for comparison is a means which continually compares said primary power source voltage with said reference voltage.

8. A system for detecting the presence and absence of power-fail conditions in a primary power source and issuing responsive signals to an operating system which derives power from said primary power source, said signals enabling said operating system to shut-down its operation in a predetermined manner when a power-fail condition is detected, and to start-up its operation in a predetermined manner when a power-recovery condition is detected after a shut-down comprising:

a. means for deriving a reference voltage whose amplitude represents a minimum acceptable amplitude of said primary power source voltage;

b. means for comparison of said primary power source voltage with said reference voltage, said primary power source and said means for deriving a reference voltage being electrically coupled to said means for comparison, said means for comparison being adapted to provide at its output a power-fail signal when said primary power source voltage is less than said reference voltage, and a power-recovery signal when said primary power source voltage is equal to or greater than said reference voltage;

c. means for discriminating said power-fail signals of sufficient duration to warrant a shut-down of said operating systems from those which do not, said means for discriminating being electrically coupled to said means for comparison and providing at its output said power-fail signal when said shut-down is warranted;

d. first means for information storage having a first input leg electrically coupled to said output of said means for discriminating and an output electrically coupled to said operating system, said means for information storage storing and providing at its output said power-fail signal when said power-fail signal appears at said input thereof;

e. first means for delay electrically coupled to said first means for information storage, said first means for delay providing at its output said power-fail signal after a first delay;

f. second means for information storage having a first input leg electrically coupled to said output of said first means for delay and an output electrically coupled to a means for shutting down at least one power supply of said operating signal, said second means for information storage storing and providing at its output said power-fail signal when said power-fail signal appears at said input thereof;

g. means for detecting the shut-down of said power supply of said operating system, said means for detecting being electrically coupled to said power supply and providing at its output a power-off signal when said shut-down is detected, said output of said means for detecting being electrically coupled to said operating system;

h. means for generating a start-up signal electrically coupled to said output of said means for detecting, said means for generating providing at its output said start-up signal when said power-off signal appears at said output of said means for detecting;

i. a gate having first and second input legs, said first and second input legs thereof being electrically coupled to (i) said output of said means for comparison, and (ii) said output of said means for generating, respectively, said gate being adapted to provide at its output said start-up signal if and only if said power-recovery signal is present at said first input leg thereof contemporaneously with the presence of said start-up signal at said second input leg thereof; said output of said gate being electrically coupled to a second input leg of each of said first and second means for information storage, said first and second means for information storage storing and providing at their respective outputs said power-recovery signal when said start-up signal appears at said output of said gate;

j. second means for delay electrically coupled to said output of said second means for information storage, said second means for delay providing at its output said power-recovery signal after a second delay, said output of said second means for delay being electrically coupled to said means for shutting down;

k. means for detecting the reactivation of said power supply of said operating system, said means for detecting said reactivation being electrically coupled to said power supply and providing at its output a power-on signal when said reactivation is detected;

l. third means for delay electrically coupled to said output of said means for detecting said reactivation, said third means for delay providing at its output said power-on signal after a third delay, said output of said third means for delay being electrically coupled to said operating system;

m. fourth means for delay electrically coupled to said output of said third means for delay, said fourth means for delay providing at its output said power-on signal after a fourth delay, said output of said fourth means for delay being electrically coupled to said operating system; and n. a power source for said system, said power source deriving its power from said primary power source.

9. In a system for (i) shutting down the operation of an operating system when a primary power source which provides power to said operating system is in a power-fail condition and for (ii) starting up the operation of said operating system when said primary power source returns to a power-recovery condition, the combination comprising:

a. means for monitoring the voltage level of said primary power source;

b. means for detecting when said monitored voltage falls below the level of a reference voltage;

c. means for discriminating a power-fail condition from a transistory drop in the voltage level of said monitored voltage, said power-fail condition occuring when the level of said monitored voltage drops below that of said reference voltage and said drop in voltage persists for at least a first interval of time or recurs within a second interval of time;

d. means for providing a power-fail signal when said primary power source is in a power-fail condition;

e. means for providing a B+ control signal at a third interval following the appearance of said power-fail signal.

f. means for providing a reset signal substantially concurrently with said B+ control signal;

g. means for removing said power-fail signal when said primary power source is in a power-recovery condition, said power-recovery condition occurring when the level of said monitored voltage rises above that of said reference voltage;

h. means for removing said B+ control signal at a fourth interval following said removal of said power-fail signal, provided said power-recovery condition persists for said fourth interval;

i. means for removing said reset signal at a fifth interval following said removal of said B+ control signal; provided said power-recovery condition persists for said fifth interval;

j. means for providing a restart at a sixth interval following said removal of said reset signal;

wherein said power-fail signal is adapted to provide to said operating system a warning that a power shut down will be carried out, said B+ control signal is adapted to shut down at least one power supply of said operating system, said reset signal is adapted to enable said operating system to lock itself into a non-operating mode, and said restart signal is adapted to enable said operating system to commence its operation.

10. The system of claim 9 having in addition thereto hold down means for substantially preventing the inadvertent removal of said power-fail signal or said B+ control signal by the electrical transient indicent to the loss of said primary source of power.

* * * * *